United States Patent
Xiong et al.

(10) Patent No.: US 9,828,106 B2
(45) Date of Patent: Nov. 28, 2017

(54) AIRCRAFT GAS TURBINE PROPULSION ENGINE CONTROL WITHOUT AIRCRAFT TOTAL AIR TEMPERATURE SENSORS

(71) Applicant: HONEYWELL INTERNATIONAL INC., Morristown, NJ (US)

(72) Inventors: Yufei Xiong, Phoenix, AZ (US); Dave Faymon, Phoenix, AZ (US); Scot Coffey, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 277 days.

(21) Appl. No.: 14/742,985

(22) Filed: Jun. 18, 2015

(65) Prior Publication Data

US 2016/0368612 A1    Dec. 22, 2016

(51) Int. Cl.
| | |
|---|---|
| *G07C 5/08* | (2006.01) |
| *B64D 27/16* | (2006.01) |
| *B64D 31/06* | (2006.01) |
| *F02C 9/28* | (2006.01) |

(52) U.S. Cl.
CPC ............. *B64D 31/06* (2013.01); *B64D 27/16* (2013.01); *F02C 9/28* (2013.01); *G07C 5/0816* (2013.01); *F05D 2270/313* (2013.01)

(58) Field of Classification Search
CPC ........ B64D 27/10; B64D 27/16; B64D 31/00; B64D 31/06; B64D 2033/0293; F02C 6/20; F02C 7/12; F02C 9/00; F02C 9/26; F02C 9/28; F02C 9/32; F02C 9/44; F02C 9/48; F05D 2220/32; F05D 2270/051; F05D 2270/07; F05D 2270/20; F05D 2270/112;

(Continued)

(56) References Cited

U.S. PATENT DOCUMENTS

| | | | | |
|---|---|---|---|---|
| 4,258,545 A | * | 3/1981 | Slater | F02C 9/00 60/226.1 |
| 4,275,557 A | * | 6/1981 | Marvin | F02C 9/28 60/39.281 |

(Continued)

FOREIGN PATENT DOCUMENTS

GB    2355046 A    4/2001

OTHER PUBLICATIONS

Extended EP Search Report for Application No. 16173128.6-1607 dated Aug. 11, 2016.

*Primary Examiner* — Thomas G Black
*Assistant Examiner* — Ce Li
(74) *Attorney, Agent, or Firm* — Lorenz & Kopf, LLP

(57) ABSTRACT

A control system for an aircraft gas turbine propulsion engine includes an engine control that is adapted to receive at least engine inlet temperature data and aircraft altitude data. The engine control is configured to determine the availability of the engine inlet temperature data and implements a measured temperature engine thrust setting schedule when the engine inlet temperature data is available, and a default temperature engine thrust setting schedule when the engine inlet temperature data is unavailable. The default temperature engine thrust setting schedule ensures that the gas turbine propulsion engine will generate at least 90% of rated engine thrust at all actual engine inlet temperatures at the sensed aircraft altitude.

16 Claims, 3 Drawing Sheets

(58) Field of Classification Search
CPC ......... F05D 2270/303; F05D 2270/304; F05D 2270/313; F05D 2220/323; G07C 5/0816
See application file for complete search history.

(56) References Cited

U.S. PATENT DOCUMENTS

| | | | |
|---|---|---|---|
| 4,748,804 A * | 6/1988 | Krukoski | F02C 9/28 |
| | | | 60/39.281 |
| 5,142,860 A | 9/1992 | Strange et al. | |
| 6,167,690 B1 | 1/2001 | Hepner et al. | |
| 6,578,794 B1 | 6/2003 | Clark et al. | |
| 6,904,340 B2 | 6/2005 | Andre et al. | |
| 6,931,857 B2 | 8/2005 | Irwin et al. | |
| 7,861,578 B2 | 1/2011 | Adibhatla et al. | |
| 8,150,564 B2 | 4/2012 | Remy | |
| 8,359,129 B2 | 1/2013 | Lemaignan et al. | |
| 8,527,173 B2 | 9/2013 | Lacoste et al. | |
| 2007/0005219 A1 | 1/2007 | Muramatsu et al. | |
| 2009/0070091 A1* | 3/2009 | Hanke | B64D 41/00 |
| | | | 703/18 |
| 2011/0208400 A1* | 8/2011 | Lickfold | F02C 9/32 |
| | | | 701/100 |
| 2012/0253559 A1 | 10/2012 | Feau | |
| 2015/0159499 A1* | 6/2015 | Bacic | F01D 11/14 |
| | | | 415/1 |
| 2015/0203209 A1* | 7/2015 | Myer | F02C 9/00 |
| | | | 701/3 |
| 2016/0061053 A1* | 3/2016 | Thomassin | F02C 6/14 |
| | | | 415/1 |

\* cited by examiner

AIRCRAFT GAS TURBINE PROPULSION ENGINE CONTROL WITHOUT AIRCRAFT TOTAL AIR TEMPERATURE SENSORS

TECHNICAL FIELD

The present invention generally relates to gas turbine engine control, and more particularly relates to aircraft gas turbine engine control without aircraft mounted total air temperature sensors.

BACKGROUND

Aircraft gas turbine propulsion engine control systems rely on an accurate measure of engine inlet temperature. Engine inlet temperature (TT2_E) is typically measured by two inlet-mounted temperature probes or one inlet mounted temperature probe with two sensing elements. These probes supply engine inlet temperature data to an engine control, which uses the engine inlet temperature data to, among other things, control engine thrust settings. When conditions conducive to icing exist, these probes are heated to prevent ice accumulation.

In addition to the engine inlet temperature probes, most aircraft are equipped with temperature probes that are used to measure external (e.g., ambient) total air temperature (TAT). These aircraft total air temperature probes are typically mounted on the surface of the aircraft. These probes are also heated to prevent ice accumulation, and are typically integrated into the engine control system to provide a backup temperature measurement in the highly unlikely event that the engine inlet temperature probes or probe heater become unavailable.

Recently, airframe manufacturers have begun looking into ways of accommodating certain non-engine aircraft needs without aircraft TAT probes. Even more recently, certain manufactures have requested that the aircraft TAT probes be removed altogether from the propulsion engine control system. This is because doing so can provide significant benefits. Such benefits include, for example, reduced aircraft recurring costs associated with not installing the TAT probes, the heater, and the associated wiring, reduced aircraft weight, reduced maintenance costs associated with the TAT probes, heater, and associated wiring, and a simplified engine control system design.

Unfortunately, there are also some drawbacks associated with removing the TAT probes. The major drawback is the loss of redundancy that the TAT probes provide as the backup temperature measurement in the highly unlikely event that the engine inlet temperature probes or probe heater become unavailable. This lack of redundancy adversely impacts the postulated Loss of Thrust Control (LOTC) rate associated with engine control systems. LOTC is generally considered the inability to modulate power between idle and 90% of rated thrust for the given conditions, and strategies to cope with the loss of engine inlet temperature measurement often result in an inability to achieve at least 90% thrust while maintaining acceptable operability (surge-free and flameout-free operation with acceptable handling qualities). In particular, the LOTC rate, which must meet certain regulatory requirements (e.g., a rate of $1\times10^{-5}$), increases significantly on certain engine designs if the TAT probes are not available, which may make the engine control system unable to meet the desired LOTC rate.

One possible solution to allow removal of the TAT probes while still meeting the required LOTC rate is to significantly increase the reliability of other system components to compensate for the LOTC rate increase. Such a solution, however, would require significant component redesigns, resulting in cost increases and schedule impacts.

Hence, there is a need for a system and method to allow the TAT probes to be removed without increasing the LOTC rate, to thereby improve overall system reliability because less aircraft components are used. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a control system for an aircraft gas turbine propulsion engine includes an engine control that is adapted to receive at least engine inlet temperature data and aircraft altitude data. The engine inlet temperature data is representative of sensed engine inlet temperature, and the aircraft altitude data is representative of sensed aircraft altitude. The engine control is configured to determine the availability of the engine inlet temperature data and implement an engine thrust setting schedule based on the determined availability of the engine inlet temperature data. The engine control implements a measured temperature engine thrust setting schedule when the engine inlet temperature data is available. The measured temperature engine thrust schedule is based at least on the sensed engine inlet temperature and the sensed aircraft altitude. The engine control implements a default temperature engine thrust setting schedule when the engine inlet temperature data is unavailable. The default temperature engine thrust schedule is based at least on the sensed aircraft altitude and a predetermined default temperature value associated with the sensed aircraft altitude. The default temperature engine thrust setting schedule ensures that the gas turbine propulsion engine will generate at least 90% of rated engine thrust at all actual engine inlet temperatures at the sensed altitude.

In another embodiment, a control system for an aircraft gas turbine propulsion engine includes an engine control that is adapted to receive at least engine inlet temperature data, aircraft speed data, and aircraft altitude data. The engine inlet temperature data is representative of sensed engine inlet temperature. The aircraft speed data is representative of sensed aircraft speed. The aircraft altitude data is representative of sensed aircraft altitude. The engine control is configured to determine the availability of the engine inlet temperature data, implement an engine thrust setting schedule based on the determined availability of the engine inlet temperature data, and generate an alert signal when the engine inlet temperature data is unavailable. The engine control implements a measured temperature engine thrust setting schedule when the engine inlet temperature data is available. The measured temperature engine thrust schedule is based at least on the sensed engine inlet temperature, the sensed aircraft speed, and the sensed aircraft altitude. The engine control implements a default temperature engine thrust setting schedule when the engine inlet temperature data is unavailable. The default temperature engine thrust schedule is based at least on the sensed aircraft altitude, the sensed aircraft speed, and a predetermined default temperature value associated with the sensed aircraft altitude and speed. The default temperature engine thrust setting schedule ensures that the gas turbine propulsion engine will generate at least 90% of rated engine thrust at all actual engine inlet temperatures at the sensed altitude.

In yet another embodiment, a control system for an aircraft gas turbine propulsion engine includes an engine control that is adapted to receive at least engine inlet temperature data and aircraft altitude data. The engine inlet temperature data is representative of sensed engine inlet temperature. The aircraft altitude data is representative of sensed aircraft altitude. The engine control is configured to determine the availability of the engine inlet temperature data and implement an engine thrust setting schedule based on the determined availability of the engine inlet temperature data. The engine control implements a measured temperature engine thrust setting schedule when the engine inlet temperature data is available. The measured temperature engine thrust schedule is based at least on the sensed engine inlet temperature and the sensed aircraft altitude. The engine control implements a default temperature engine thrust setting schedule when the engine inlet temperature data is unavailable. The default temperature engine thrust schedule is based at least on the sensed aircraft altitude and a predetermined default temperature value associated with the sensed aircraft altitude. The engine control additionally implements a default operability control schedule that provides predetermined surge margin and flameout margin. The engine control is additionally configured, when the engine inlet temperature data is unavailable, to selectively implement the default temperature engine thrust setting schedule and the default operability control schedule. The default temperature engine thrust setting schedule ensures that the gas turbine propulsion engine will generate at least 90% of rated engine thrust at all actual engine inlet temperatures at the sensed altitude.

Furthermore, other desirable features and characteristics of the aircraft gas turbine propulsion engine control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although a dual-spool gas turbine engine is described, the systems and methods may be implemented in gas turbine engines with more or less than this number of spools.

Figure 1:
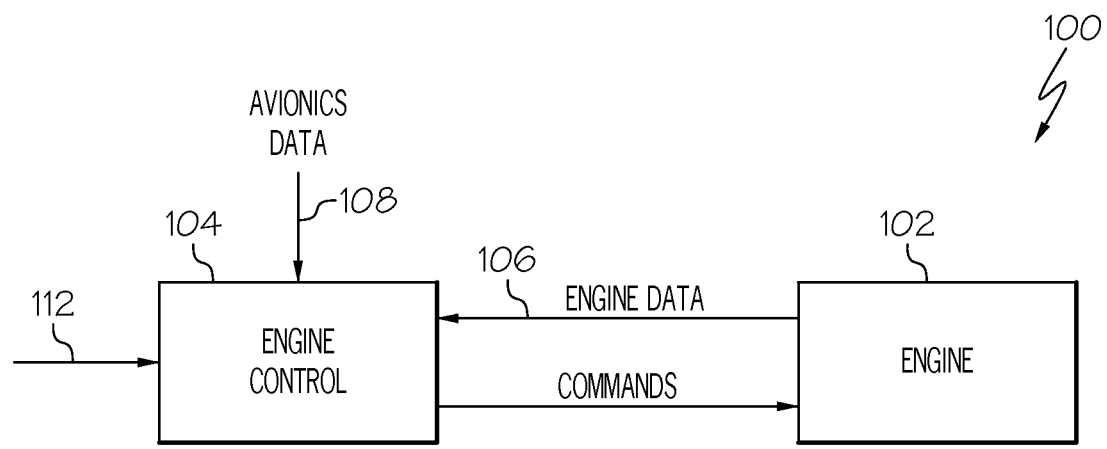
FIG. 1 depicts a functional block diagram of one example embodiment of a control system for an aircraft gas turbine propulsion engine.
Figure 2:
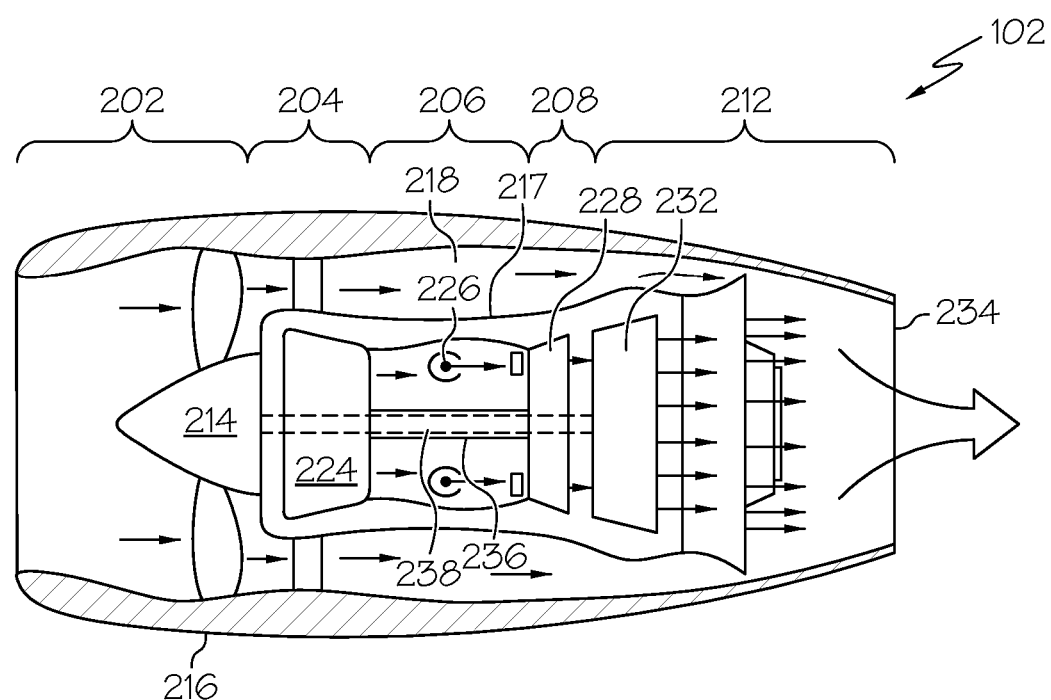
FIG. 2 depicts a simplified cross section view of a turbofan gas turbine propulsion engine that may be used in the system of FIG. 1.

Referring to FIG. 1, a functional block diagram of one example embodiment of a control system 100 for an aircraft gas turbine propulsion engine is depicted, and includes a gas turbine engine 102 and an engine control 104. The gas turbine engine 102 may be variously configured and implemented, but it is preferably an aircraft gas turbine propulsion engine, such as a turbofan gas turbine propulsion engine. Such engines, as is generally known, and as illustrated more clearly in FIG. 2, include an intake section 202, a compressor section 204, a combustion section 206, a turbine section 208, and an exhaust section 212. The intake section 202 includes a fan 214, which is mounted in a fan case 216. The fan 214 draws air into the intake section 202 and accelerates it. A fraction of the accelerated air exhausted from the fan 214 is directed through a bypass section 218 disposed between the fan case 216 and an engine cowl 217, and provides a forward thrust. The remaining fraction of air exhausted from the fan 214 is directed into the compressor section 204.

The compressor section 204 may include one or more compressors 224, which raise the pressure of the air directed into it from the fan 214, and directs the compressed air into the combustion section 206. In the depicted embodiment, only a single compressor 224 is shown, though it will be appreciated that one or more additional compressors could be used. In the combustion section 206, which includes a combustor assembly 226, the compressed air is mixed with fuel that is controllably supplied to the combustor assembly 226 from a non-illustrated fuel source. The fuel and air mixture is combusted, and the high energy combusted air mixture is then directed into the turbine section 208.

The turbine section 208 includes one or more turbines. In the depicted embodiment, the turbine section 208 includes two turbines, a high pressure turbine 228, and a low pressure turbine 232. However, it will be appreciated that the engine 102 could be configured with more or less than this number of turbines. No matter the particular number, the combusted air mixture from the combustion section 206 expands through each turbine 228, 232, causing it to rotate. The combusted air mixture is then exhausted through a propulsion nozzle 234 disposed in the exhaust section 212, providing additional forward thrust. As the turbines 228 and 232 rotate, each drives equipment in the engine 102 via concentrically disposed shafts or spools. Specifically, the high pressure turbine 228 drives the compressor 224 via a high pressure spool 236, and the low pressure turbine 232 drives the fan 214 via a low pressure spool 238.

Returning to FIG. 1, regardless of the specific configuration of the engine 102, it is seen that the engine control 104 is coupled to receive various types of data. The data supplied to the engine control 104 is varied, and includes various types of engine data 106 and various types of avionics data 108. The engine data 106 includes data supplied from various sensors, as well as sensor health data. The sensors, while not specifically depicted in FIG. 1 may include sensors that supply data representative of, for example, fan speed (N1), engine inlet temperature (TT2_E), interstage turbine temperature (ITT), and high pressure turbine speed (N2), just to name a few. The sensor health data may also vary, but includes at least data representative of the health of the engine inlet temperature sensors and the heaters associated with the engine inlet air temperature sensors.

The avionics data 108 may also vary, but includes at least aircraft altitude data, which is supplied from non-illustrated sensors or avionics systems, and is representative of sensed aircraft altitude. The avionics data may also, in some embodiments, include aircraft speed data, which may also be supplied from non-illustrated sensors or avionics systems, and is representative of sensed aircraft speed.

As FIG. 1 also depicts, the engine control 104 also receives a thrust command 112 from, for example, a non-illustrated throttle control located in an aircraft cockpit. The engine control is configured, in response to the thrust command, and based on the engine data 106 and the avionics data 108, to control the thrust generated by the engine 102. To do so, the engine control 104, as is generally known, and as previously described, implements an engine thrust setting schedule. However, unlike presently known engine controls, the depicted engine control 104 is configured to determine the availability of the engine inlet temperature data, and implement an engine thrust setting schedule based on the determined availability of the engine inlet temperature data.

More specifically, the engine control 104 is configured to implement either a measured temperature engine thrust setting schedule or a default temperature engine thrust setting schedule, depending upon whether or not the engine inlet temperature is available. When the engine inlet temperature data is available, the engine control 104 implements the measured temperature engine thrust schedule. The measured temperature engine thrust schedule is based at least on the sensed engine inlet temperature and the sensed aircraft altitude. In some embodiments, it will be appreciated that the measured temperature engine thrust schedule is additionally based on aircraft speed (e.g., Mach no.), and may also be based on air bleed levels extracted for features such as cabin pressurization or nacelle or aircraft control surface anti-icing, and/or the health of the other engine (in two-engine applications).

Figure 3:
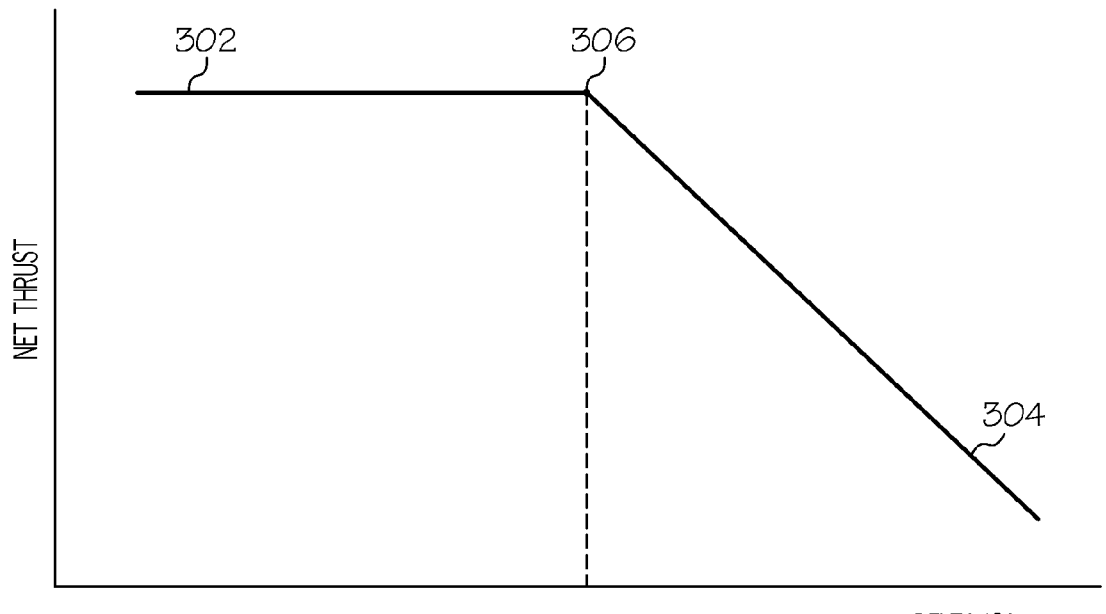
FIG. 3 depicts an embodiment of a conventional thrust schedule that may be implemented by the control system of FIG. 1.

The measured temperature engine thrust schedule is the normal thrust setting schedule that is typically implemented to schedule the thrust generated by a gas turbine propulsion engine. As is generally known, aircraft altitude and engine inlet air temperature (and in some instances aircraft speed and/or other parameters such as engine air bleed and/or health status of the other engine) are used to determine the normal thrust setting schedules for gas turbine propulsion engines. As depicted in FIG. 3, these schedules, which are certified with the gas turbine propulsion engine, include a flat rate thrust setting schedule 302 and a thermal thrust setting schedule 304, and represent the maximum rated thrust for the given conditions. As FIG. 3 also depicts, these schedules are based on the International Standard Atmosphere (ISA) temperatures, and more specifically, the deviation of the sensed engine inlet temperature from the ISA—generally referred to as Delta ISA.

Figure 4:
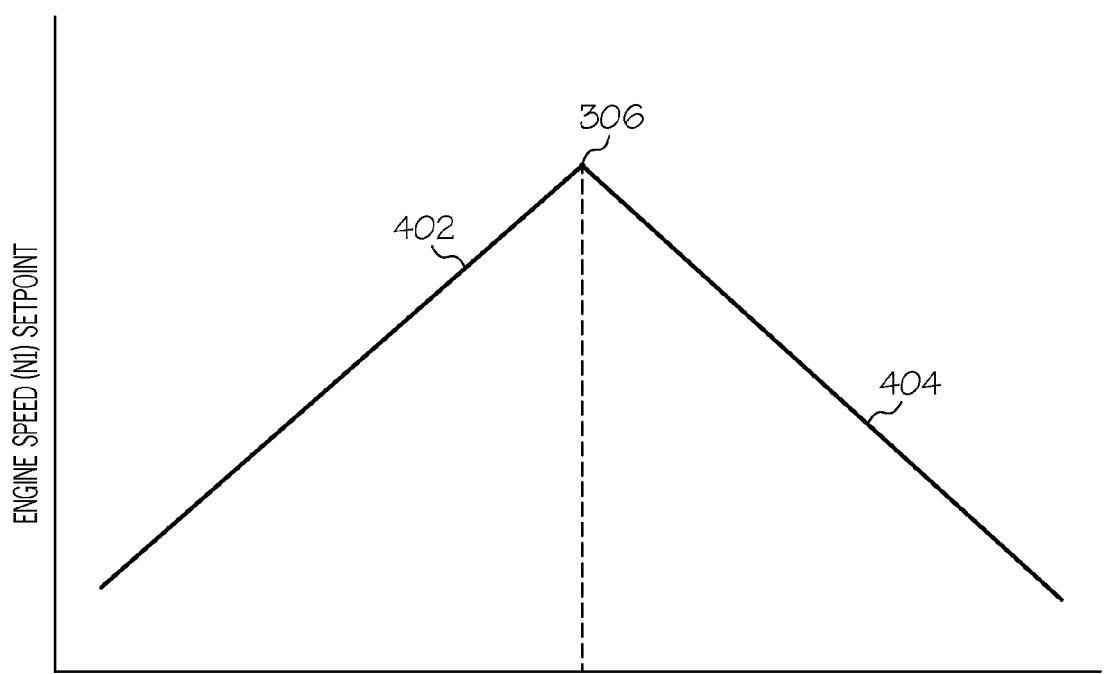
FIG. 4 depicts an embodiment of a conventional speed setpoint schedule that may be implemented by the control system of FIG. 1.

It is also generally known that engine speed, for the given aircraft altitude and engine inlet air temperature (and in some instances aircraft speed and/or other parameters such as engine air bleed and/or health status of the other engine), can be correlated to engine thrust. Thus, as FIG. 4 depicts, the thrust setting schedules also include engine speed setpoint schedules, which also comprise flat rate speed setting schedules 402 and thermal speed setting schedules 404. When the gas turbine propulsion engine 102 is a turbofan gas turbine propulsion engine, such as the one depicted in FIG. 2 and described above, engine fan speed (N1) may be used for the engine speed setpoint schedules.

Figure 5:
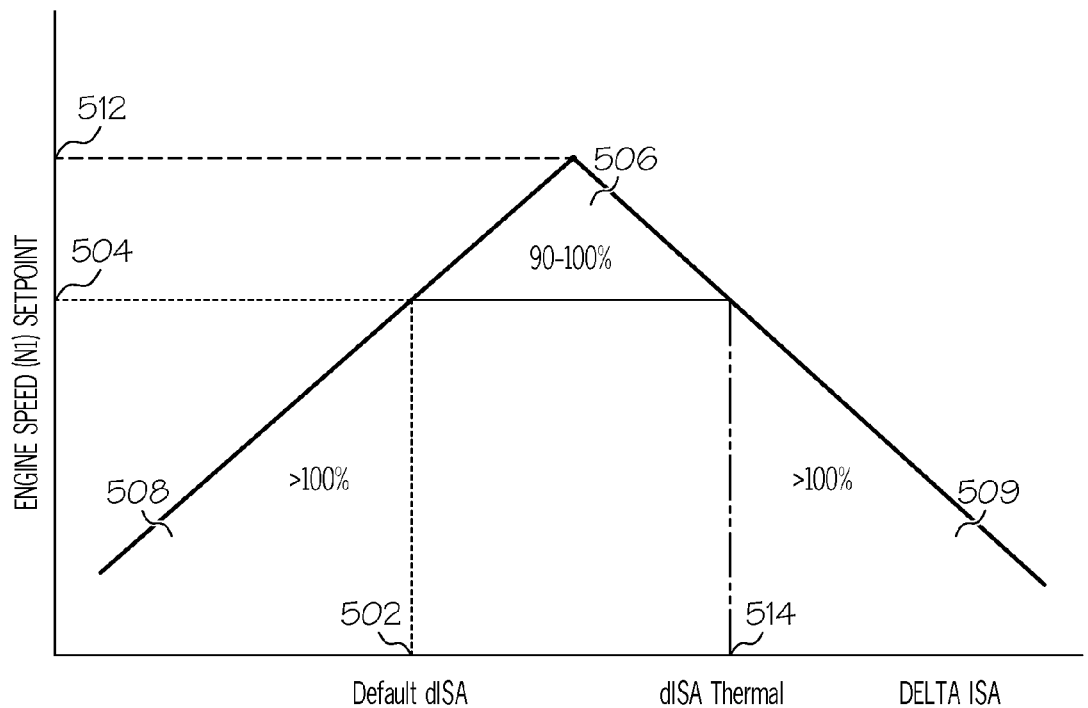
FIG. 5 depicts an embodiment of a default temperature engine thrust setting schedule that may be implemented by the control system of FIG. 1.

As noted above, the engine control 104 implements the default temperature engine thrust setting schedule when the engine inlet temperature data is unavailable. The default temperature engine thrust schedule is also based at least on the sensed aircraft altitude (and in some instances aircraft speed and/or other parameters such as engine air bleed and/or health status of the other engine). However, because the sensed engine inlet temperature is unavailable, it is based additionally on a predetermined default temperature value associated with the sensed aircraft altitude (and in some instances aircraft speed and/or other parameters such as engine air bleed and/or health status of the other engine). The predetermined default temperature value 502, which is equal to ISA+"Default dISA," and is labeled "Default dISA" in FIG. 5 (which stands for "default Delta ISA"), represents a temperature value that will guarantee a minimum of 90% of the maximum rated thrust for the sensed aircraft altitude (and in some instances aircraft speed and/or other parameters such as engine air bleed and/or health status of the other engine).

More specifically, the engine control 104 sets the engine speed (e.g., N1) 504, and thus the engine thrust, to the speed that correlates to the predetermined default temperature value (ISA+"Default dISA") 502. Thus, the default temperature engine thrust setting schedule ensures that, when actual engine inlet temperature is at or above the predetermined default temperature value (ISA+"Default dISA") 502, the gas turbine propulsion engine will generate at least 90% of rated engine thrust at the sensed aircraft altitude (and in some instances aircraft speed and/or other parameters such as engine air bleed and/or health status of the other engine). More specifically, when the actual engine inlet temperature is at the predetermined default temperature value (ISA+"Default dISA") 502, the gas turbine propulsion engine 102 will generate 100% of rated engine thrust at the sensed aircraft altitude (and in some instances aircraft speed and/or other parameters such as engine air bleed and/or health status of the other engine). When the actual engine inlet temperature is greater than the predetermined default temperature value, but below the point 306 at which the flat rate 302, 402 and thermal 304, 404 setting schedules intersect (e.g., in region 506), the gas turbine propulsion engine 102 will generate between 90-100% of rated engine thrust, at the sensed aircraft altitude (and in some instances aircraft speed and/or other parameters such as engine air bleed and/or health status of the other engine). When the actual engine inlet temperature is less than the predetermined default temperature value (e.g., in region 508), the gas turbine propulsion engine 102 will generate greater than 100% of rated engine thrust at the sensed aircraft altitude (and in some instances aircraft speed and/or other parameters such as engine air bleed and/or health status of the other engine). When actual engine inlet temperature is at the point 306 at which the flat rate 302, 402 and thermal 304, 404 setting schedules intersect, the gas turbine propulsion engine 102 will generate 90% of rated engine thrust, at the sensed aircraft altitude (and in some instances aircraft speed and/or other parameters such as engine air bleed and/or health status of the other engine). As actual temp increases beyond the intersection point 306, the thrust that the gas turbine propulsion engine 102 generates increases, eventually hitting 100% rated thrust when the N1 speed associated with the predetermined default temperature value matches the N1 speed for rated thrust. Above that temperature, thrust will exceed 100% of rated thrust, but the engine may exceed internal gas temperature limits, which is why, as will be described below, the engine control 104 is additionally configured to implement an ITT control governor.

Figure 6:
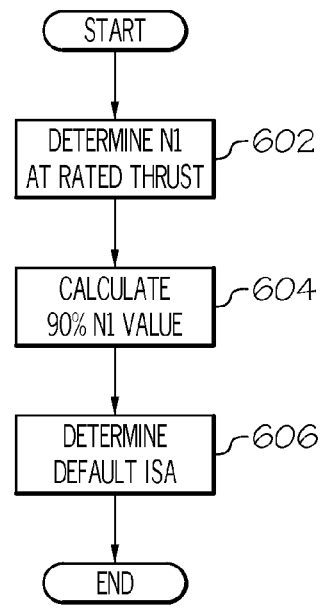
FIG. 6 depicts a process, in flowchart form, that is used to determine predetermined default temperature value associated with each of a plurality aircraft altitudes.

Before proceeding further, a brief description of the process that is used to determine the predetermined default temperature value associated with each of the aircraft altitudes (and in some instances aircraft speed and/or other parameters such as engine air bleed and/or health status of the other engine) will now be provided. Described generally, the predetermined default temperature values (i.e., the "default Delta ISA" values) are back-calculated from the normal thrust setting schedules (see FIGS. 3 and 4) to be the point at which the flat rate setting schedules 302, 402 yield 90% of the rated thrust for the Delta ISA 306 at which the flat rate 302, 402 and thermal 304, 404 setting schedules intersect. More specifically, and with reference now to FIG. 6, for a turbofan gas turbine propulsion engine, the fan speed (N1) at the maximum rated thrust 602 is first determined (512 in FIG. 5). Thereafter, a 90% thrust fan speed value 604 is calculated (504 in FIG. 5). This value 604 is equal to the fan speed (N1) needed to attain 90% of the rated engine thrust (at the same altitude and, in some instances, aircraft speed). The predetermined default temperature value 606 at the 90% thrust fan speed value 604 is then determined (502 in FIG. 5). It should be noted that in a particular preferred embodiment, the default temperature values are predetermined as part of the design and are coded into the software. In some embodiments, however, the default temperature values may be determined dynamically, in real-time.

As noted above, in addition to implementing the default temperature engine thrust setting schedule, the engine control 104 is additionally configured to implement an ITT control governor when the engine inlet temperature data is unavailable. The ITT control governor is configured to selectively control engine thrust, as needed, to limit ITT to a predetermined ITT limit temperature when the actual ambient temperature is on the right side of the delta ISA temperature 514 (labeled "dISA Thermal" in FIG. 5), which means when actual ambient temperature is greater than ISA+"dISA Thermal," and is the temperature at which the engine speed (e.g., N1) setpoint resulting from the predetermined default temperature value is equal to the thermal rating N1 setpoint. The ITT control governor ensures that the engine 102 will not run too hot on relatively hot days (e.g., days when actual engine inlet temperature is above the ISA+"dISA Thermal" 514). As may be appreciated, the engine control governor uses ITT data supplied from appropriate ITT sensor(s) or a synthesized ITT value in the engine 102. It should be noted that, if actual engine inlet temperature is greater than ISA+dISA Thermal (e.g., in region 509), the gas turbine propulsion engine 102 will generate greater than 100% of rated engine thrust at the sensed aircraft altitude (and in some instances aircraft speed and/or other parameters such as engine air bleed and/or health status of the other engine).

Because, as noted above, when the actual engine inlet temperature is in regions 508 or 509 the gas turbine propulsion engine 102 will generate greater than 100% of rated engine thrust, the engine control 104 is preferably configured to generate an alert signal when the engine inlet temperature data is unavailable. This will ensure the pilot is aware that the default temperature engine thrust setting schedule is being implemented, so that the pilot can more closely monitor aircraft speed and thus engine thrust.

As with presently known engine control techniques, the engine control 104 depicted and described herein is also preferably configured to implement a default operability control schedule when the engine inlet temperature data is unavailable. The default operability control schedule, which is used to control, for example, inlet guide vane position, surge bleed valve position, and acceleration and deceleration rates, provides predetermined surge and flameout margins and dynamic control loop gain scheduling. This default operability control schedule may use a default operability engine inlet temperature schedule that may be a function of aircraft altitude (and possibly aircraft speed and/or engine air bleed), or it may be unique operability schedules that are a function of aircraft altitude (and possibly aircraft speed).

Although the default temperature engine thrust setting schedule and the default operability control schedule could be implemented independent of each other, in some embodiments, these schedules are optimized for overall engine operability and thrust scheduling, which may also include opening some engine and aircraft bleed, such as nacelle anti-ice bleed, environmental control bleed, and wing anti-ice bleed etc. The optimization for a given altitude and/or aircraft speed (e.g., Mach number) will minimize the impact to thrust and operability.

The aircraft gas turbine propulsion engine control system 100 described herein allows the TAT probes to be removed from aircraft without increasing LOTC rates, and thereby improves overall system reliability because less aircraft components are used.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control system for an aircraft gas turbine propulsion engine, comprising:
   an engine control adapted to receive at least engine inlet temperature data and aircraft altitude data, the engine inlet temperature data representative of sensed engine inlet temperature, the aircraft altitude data representative of sensed aircraft altitude, the engine control configured to (i) determine availability of the engine inlet temperature data and (ii) implement an engine thrust setting schedule based on the determined availability of the engine inlet temperature data, wherein:
   the engine control implements a measured temperature engine thrust setting schedule when the engine inlet temperature data is available, the measured temperature engine thrust schedule based at least on the sensed engine inlet temperature and the sensed aircraft altitude,
   the engine control implements a default temperature engine thrust setting schedule when the engine inlet temperature data is unavailable, the default temperature engine thrust schedule based at least on the sensed aircraft altitude and a predetermined default temperature value associated with the sensed aircraft altitude,
   the default temperature engine thrust setting schedule ensures that the gas turbine propulsion engine will generate at least 90% of rated engine thrust at all actual engine inlet temperatures at the sensed altitude,
   when actual engine inlet temperature is at the predetermined default temperature value, the gas turbine propulsion engine will generate 100% of rated engine thrust at the sensed aircraft altitude,
   when actual engine inlet temperature is below the predetermined default temperature value, the gas turbine propulsion engine will generate greater than 100% of rated engine thrust at the sensed aircraft altitude,
   when the actual engine inlet temperature is greater than the predetermined default temperature value and less than a temperature at which a fan speed setpoint resulting from the predetermined default temperature value is equal to a thermal rating fan speed setpoint, the gas turbine propulsion engine will generate between 90% and 100% of rated engine thrust at the sensed aircraft altitude, and
   when the actual engine inlet temperature is greater than the temperature at which the fan speed setpoint resulting from the predetermined default temperature value is equal to the thermal rating fan speed setpoint, the gas turbine propulsion engine will generate greater than 100% of rated engine thrust at the sensed aircraft altitude.

2. The control system of claim 1, wherein:
   the engine control is further adapted to receive one or more of aircraft speed data, engine air bleed status, and health status of another engine; and
   the measured temperature engine thrust schedule and the default temperature engine thrust schedule are both based additionally on one or more of the aircraft speed data, engine air bleed status, and health status of another engine.

3. The control system of claim 1, wherein:
   the engine control is further adapted to receive interstage turbine temperature (ITT) data; and
   the engine control further implements an ITT control governor, the ITT control governor configured to selectively control engine thrust, as needed, to limit ITT to a predetermined ITT limit temperature.

4. The control system of claim 1, wherein:
   the engine control additionally implements a default operability control schedule, the default operability control schedule providing predetermined surge margin and flameout margin.

5. The control system of claim 1, wherein the engine control is further configured to generate an alert signal when the engine inlet temperature data is unavailable.

6. The control system of claim 1, wherein:
   the gas turbine engine is a turbofan engine having a fan that rotates at a fan speed; and
   the predetermined default temperature value associated with each of the aircraft altitudes is predetermined, for at least a plurality of aircraft altitudes, by:
   determining maximum fan speed at the rated thrust;
   calculating a 90% thrust fan speed value, the 90% thrust fan speed value equal to the fan speed needed to attain 90% of the rated engine thrust at the engine inlet temperature associated with the maximum fan speed at rated thrust; and
   determining the predetermined default temperature value at the 90% thrust fan speed value on a flat rate thrust schedule.

7. A control system for an aircraft gas turbine propulsion engine, comprising:
   an engine control adapted to receive at least engine inlet temperature data, aircraft speed data, and aircraft altitude data, the engine inlet temperature data representative of sensed engine inlet temperature, the aircraft speed data representative of sensed aircraft speed, the aircraft altitude data representative of sensed aircraft altitude, the engine control configured to (i) determine availability of the engine inlet temperature data, (ii) implement an engine thrust setting schedule based on the determined availability of the engine inlet temperature data, (iii) and generate an alert signal when the engine inlet temperature data is unavailable, wherein:
the engine control implements a measured temperature engine thrust setting schedule when the engine inlet temperature data is available, the measured temperature engine thrust schedule based at least on the sensed engine inlet temperature, the sensed aircraft speed, and the sensed aircraft altitude,
the engine control implements a default temperature engine thrust setting schedule when the engine inlet temperature data is unavailable, the default temperature engine thrust schedule based at least on the sensed aircraft altitude, the sensed aircraft speed, and a predetermined default temperature value associated with the sensed aircraft altitude and speed,
the default temperature engine thrust setting schedule ensures that the gas turbine propulsion engine will generate at least 90% of rated engine thrust at all actual engine inlet temperatures at the sensed altitude,
when actual engine inlet temperature is at the predetermined default temperature value, the gas turbine propulsion engine will generate 100% of rated engine thrust at the sensed aircraft altitude;
when actual engine inlet temperature is below the predetermined default temperature value, the gas turbine propulsion engine will generate greater than 100% of rated engine thrust at the sensed aircraft altitude,
when the actual engine inlet temperature is greater than the predetermined default temperature value and less than a temperature at which a fan speed setpoint resulting from the predetermined default temperature value is equal to a thermal rating fan speed setpoint, the gas turbine propulsion engine will generate between 90% and 100% of rated engine thrust at the sensed aircraft altitude, and
when the actual engine inlet temperature is greater than the temperature at which the fan speed setpoint resulting from the predetermined default temperature value is equal to the thermal rating fan speed setpoint, the gas turbine propulsion engine will generate greater than 100% of rated engine thrust at the sensed aircraft altitude.

8. The control system of claim 7, wherein:
the engine control is further adapted to receive interstage turbine temperature (ITT) data; and
the engine control further implements an ITT control governor when the engine inlet temperature data is unavailable, the ITT control governor configured to selectively control engine thrust, as needed, to limit the ITT to a predetermined ITT limit temperature.

9. The control system of claim 7, wherein:
the engine control additionally implements a default operability control schedule, the default operability control schedule providing predetermined surge margin and flameout margin; and
the engine control is additionally configured, when the engine inlet temperature data is unavailable, to implement both the default temperature engine thrust setting schedule and the default operability control schedule, to thereby optimize engine thrust generation.

10. The control system of claim 7, wherein engine thrust generation and operability is optimized by commanding bleed air to one or more of a nacelle anti-ice system, an environmental control system, and an aircraft wing anti-ice system.

11. The control system of claim 7, wherein:
the gas turbine engine is a turbofan engine having a fan that rotates at a fan speed; and
the predetermined default temperature value associated with each of the aircraft altitudes is predetermined, for at least at a plurality of aircraft altitudes, by:
determining maximum fan speed at the rated thrust;
calculating a 90% thrust fan speed value, the 90% thrust fan speed value equal to the fan speed needed to attain 90% of the rated engine thrust at the engine inlet temperature associated with the maximum fan speed at rated thrust; and
determining the predetermined default temperature value at the 90% thrust fan speed value on a flat rate thrust schedule.

12. A control system for an aircraft gas turbine propulsion engine, comprising:
an engine control adapted to receive at least engine inlet temperature data and aircraft altitude data, the engine inlet temperature data representative of sensed engine inlet temperature, the aircraft altitude data representative of sensed aircraft altitude, the engine control configured to (i) determine availability of the engine inlet temperature data and (ii) implement an engine thrust setting schedule based on the determined availability of the engine inlet temperature data, wherein:
the engine control implements a measured temperature engine thrust setting schedule when the engine inlet temperature data is available, the measured temperature engine thrust schedule based at least on the sensed engine inlet temperature and the sensed aircraft altitude,
the engine control implements a default temperature engine thrust setting schedule when the engine inlet temperature data is unavailable, the default temperature engine thrust schedule based at least on the sensed aircraft altitude and a predetermined default temperature value associated with the sensed aircraft altitude,
the engine control additionally implements a default operability control schedule, the default operability control schedule providing predetermined surge margin and flameout margin,
the engine control is additionally configured, when the engine inlet temperature data is unavailable, to selectively implement both the default temperature engine thrust setting schedule and the default operability control schedule, to thereby optimize engine thrust generation,
the default temperature engine thrust setting schedule ensures that the gas turbine propulsion engine will generate at least 90% of rated engine thrust at all actual engine inlet temperatures at the sensed altitude,
when actual engine inlet temperature is at the predetermined default temperature value, the gas turbine propulsion engine will generate 100% of rated engine thrust at the sensed aircraft altitude,
when actual engine inlet temperature is below the predetermined default temperature value, the gas turbine propulsion engine will generate greater than 100% of rated engine thrust at the sensed aircraft altitude, when the actual engine inlet temperature is greater than the predetermined default temperature value and less than a temperature at which a fan speed setpoint resulting from the predetermined default temperature value is equal to a thermal rating fan speed setpoint, the gas turbine propulsion engine will generate between 90% and 100% of rated engine thrust at the sensed aircraft altitude, and when the actual engine inlet temperature is greater than the temperature at which the fan speed setpoint resulting from the predetermined default temperature value is equal to the thermal rating fan speed setpoint, the gas turbine propulsion engine will generate greater than 100% of rated engine thrust at the sensed aircraft altitude.

13. The control system of claim 12, wherein:
the engine control is further adapted to receive aircraft speed data, the aircraft speed data representative of sensed aircraft speed; and
the measured temperature engine thrust schedule and the default temperature engine thrust schedule are both based additionally on the sensed aircraft speed data.

14. The control system of claim 12, wherein:
the engine control is further adapted to receive interstage turbine temperature (ITT) data; and
the engine control further implements an ITT control governor, the ITT control governor configured to selectively control engine thrust, as needed, to limit ITT to a predetermined ITT limit temperature.

15. The control system of claim 12, wherein the engine control is further configured to generate an alert signal when the engine inlet temperature data is unavailable.

16. The control system of claim 12, wherein:
the gas turbine engine is a turbofan engine having a fan that rotates at a fan speed; and
the predetermined default temperature value associated with each of the aircraft altitudes is predetermined, for at least at a plurality of aircraft altitudes, by:
determining maximum fan speed at the rated thrust;
calculating a 90% thrust fan speed value, the 90% thrust fan speed value equal to the fan speed needed to attain 90% of the rated engine thrust at the engine inlet temperature associated with the maximum fan speed at rated thrust; and
determining the predetermined default temperature value at the 90% thrust fan speed value on a flat rate thrust schedule.

* * * * *